United States Patent [19]
Espenschied et al.

[11] 3,918,312
[45] Nov. 11, 1975

[54] HYDRAULICALLY OPERATED TRANSMISSION SYSTEM FOR AUTOMOTIVE VEHICLES

[75] Inventors: Helmut Espenschied, Ludwigsburg; Georg Rothfuss, Ditzinger; Hans-Dietrich Smentek, Vaihingen, all of Germany

[73] Assignee: Robert Bosch G.m.b.H., Stuttgart, Germany

[22] Filed: June 7, 1974

[21] Appl. No.: 477,477

[30] Foreign Application Priority Data
June 8, 1973 Germany............................ 2329364

[52] U.S. Cl..... 74/230.17 F; 74/230.17 A; 251/141; 137/625.48
[51] Int. Cl.²......................................... F16H 55/52
[58] Field of Search ........ 74/216.5, 217 R, 217 CV, 74/230.16, 230.17 R, 230.17 A, 230.17 B, 230.17 C, 230.17 D, 230.17 F; 251/141; 137/625.48

[56] References Cited
UNITED STATES PATENTS

| | | | |
|---|---|---|---|
| 2,585,732 | 2/1952 | Braman...................... | 74/230.17 B |
| 2,823,560 | 2/1958 | Harp et al.................. | 74/230.17 C |
| 2,878,690 | 3/1959 | Capron et al.............. | 74/230.17 F |
| 3,043,152 | 7/1962 | Karig et al................. | 74/230.17 F |
| 3,115,049 | 12/1963 | Moan......................... | 74/230.17 F |
| 3,618,413 | 11/1971 | Cherpes..................... | 74/230.17 F |
| 3,665,963 | 5/1972 | Dick........................... | 251/141 |
| 3,770,018 | 11/1973 | Sugimura................... | 251/141 |

*Primary Examiner*—Samuel Scott
*Assistant Examiner*—Allan R. Burke
*Attorney, Agent, or Firm*—Michael S. Striker

[57] ABSTRACT

An automatic transmission system for use in automotive vehicles wherein the engine shaft drives an output shaft through a medium of a reversing gear and the output shaft carries a disk-shaped clutch element which can drive one flange of a variable-pitch sheave on the output shaft. The sheave forms part of a belt drive the other sheave of which drives one or more wheels. The flanges of the sheave on the output shaft are rotatable relative to the output shaft and are movable axially of the output shaft with and relative to each other by a piston which is reciprocable in a cylinder of the output shaft. A helical spring urges the sheave on the output shaft to a position in which the one flange is disengaged from the clutch element. When the cylinder receives pressurized fluid from a hydraulic regulating unit, the piston causes the one flange to engage the clutch element so that the belt drive rotates the wheel or wheels. A further increase of fluid pressure in the cylinder causes the other flange of the sheave on the output shaft to move toward the one flange and to thus change the speed ratio of the belt drive. The regulating unit has a pressure regulating valve which is controlled by an electromagnet. The latter can be influenced by the speed of the engine shaft, by the position of the gas and/or brake pedal, by the position of the kickdown switch and/or by a device which is actuated when the vehicle travels on a sloping road surface.

11 Claims, 4 Drawing Figures

HYDRAULICALLY OPERATED TRANSMISSION SYSTEM FOR AUTOMOTIVE VEHICLES

BACKGROUND OF THE INVENTION

The present invention relates to transmissions in general, and more particularly to improvements in transmission systems which can be used in automotive vehicles. Still more particularly, the invention relates to improvements in automatic transmission systems for automotive vehicles or the like.

It is already known to equip an automobile with a belt drive having a variable pitch sheave on the rear wheel axle and a variable pitch sheave on a shaft which is driven by the engine. The speed ratio of the belt drive depends on the distance between the flanges of the two sheaves, i.e., the ratio increases if the distance between the flanges on the shaft decreases (whereby the distance between the flanges of the sheave on the axle increases) and the ratio decreases if the distance between the flanges of the sheave on the shaft increases because the belt which is trained over the two sheaves then moves closer to the axis of the shaft and further away from the axis of the axle. As a rule, such transmission systems further employ a clutch which is disengaged when the engine is idling and is engaged when the operator of the vehicle shifts into a forward or reverse gear to thereby set the vehicle in motion.

In presently known transmission systems of the just outlined character, one flange of the sheave on the shaft is fixedly secured to the shaft and the other flange is rotatable on and movable axially of the shaft. The means for moving the movable flange toward and away from the fixedly mounted flange of the sheave on the shaft includes a plurality of devices, such as a gas pedal, a brake pedal, a kickback switch, a starter button, a centrifugal governor which monitors the speed of the output shaft of the engine, and others. It is also known to construct the transmission system in such a way that initial depression of the gas pedal results in engagement of the aforementioned clutch and a further depression of the gas pedal results in a change of the speed ratio of the belt drive. In such transmission systems, the weights of a centrifugal governor influence the position of the movable flange to thereby change the speed ratio whereby the shifting of movable flange toward the fixedly mounted flange of the sheave on the shaft causes the belt drive to rotate the wheels at a higher speed.

The just described transmission systems exhibit a number of drawbacks. Thus, the action of the relatively weak governor must be boosted by an auxiliary shifting unit which is operatively connected with the gas pedal and allows for braking by the engine during travel on uneven terrain. The auxiliary unit operates with suction and, to this end, the axially movable flange of the sheave on the shaft constitutes a membrane and the auxiliary unit further includes a valve which regulates the suction at one side of the membrane. It has been found that the just described transmission systems are incapable of transmitting a substantial torque.

SUMMARY OF THE INVENTION

An object of the invention is to provide an automatic transmission system for automotive vehicles or the like which is capable of reacting, with a minimum of delay, to changes in a large number of parameters such as the RPM of engine, the position of the gas and/or brake pedal, the position of the kickdown switch and/or others.

Another object of the invention is to provide a novel and improved arrangement for changing the speed ratio of one or more belt drives in an automatic transmission system for automotive vehicles.

A further object of the invention is to provide novel and improved variable-pitch sheaves for belt drives in automatic transmission systems for automotive vehicles.

An additional object of the invention is to provide novel and improved means for changing the axial positions of flanges in the improved variable-pitch sheaves.

The invention is embodied in an automatic transmission system for automotive vehicles or the like which comprises a driven output shaft (e.g., a transverse shaft which can be driven in two directions by the shaft of an internal combustion engine through the medium of a reversing gear) and at least one belt drive having a plurality of speed ratios and including two variable-pitch sheaves and at least one endless flexible element (e.g., a V-belt) which is trained over the sheaves. One of the sheaves includes two flanges which are axially movably and rotatably mounted on the output shaft and one of which is movable axially of the other flange. The transmission system further comprises a clutch element mounted on and driven by the output shaft and adjacent to the other flange of the one sheave, and means for moving the flanges with and relative to each other axially of the output shaft. The moving means comprises a shifting member (preferably a piston which is movable in an axial bore of the output shaft) which is displaceable between a first position in which the other flange of the sheave on the output shaft is disengaged from the clutch element so that the output shaft can rotate relative to the one sheave or vice versa, a second position in which the other flange of the one sheave engages with the clutch element and is driven by the output shaft when the latter rotates, and a plurality of third positions in each of which the one flange of the one sheave is located at a different distance from the other flange so that each third position of the shifting member corresponds to a different speed ratio of the belt drive because the flexible element moves radially of the output shaft when the distance between the flanges of the one sheave changes.

The transmission system further comprises means for displacing the shifting member. Such displacing means preferably comprises a helical spring or other suitable resilient means for biasing the shifting member to its first position and a fluid-operated motor which includes a portion of the output shaft and a piston which constitutes the shifting member and is movable in the portion of the output shaft to thereby move the flanges of the one sheave with and/or relative to each other. The pressure of fluid in the motor can be changed by a regulating unit which may include a pressure regulating valve capable of changing the fluid pressure in response to actuation of any one of a plurality of devices including a centrifugal governor or the like which monitors the RPM of the engine shaft, a gas pedal, a brake pedal, a kickdown switch and a device which is actuated when the vehicle travels on a sloping road surface.

The novel features which are considered as characteristic for the invention are set forth in particular in the appended claims. The improved transmission system, itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
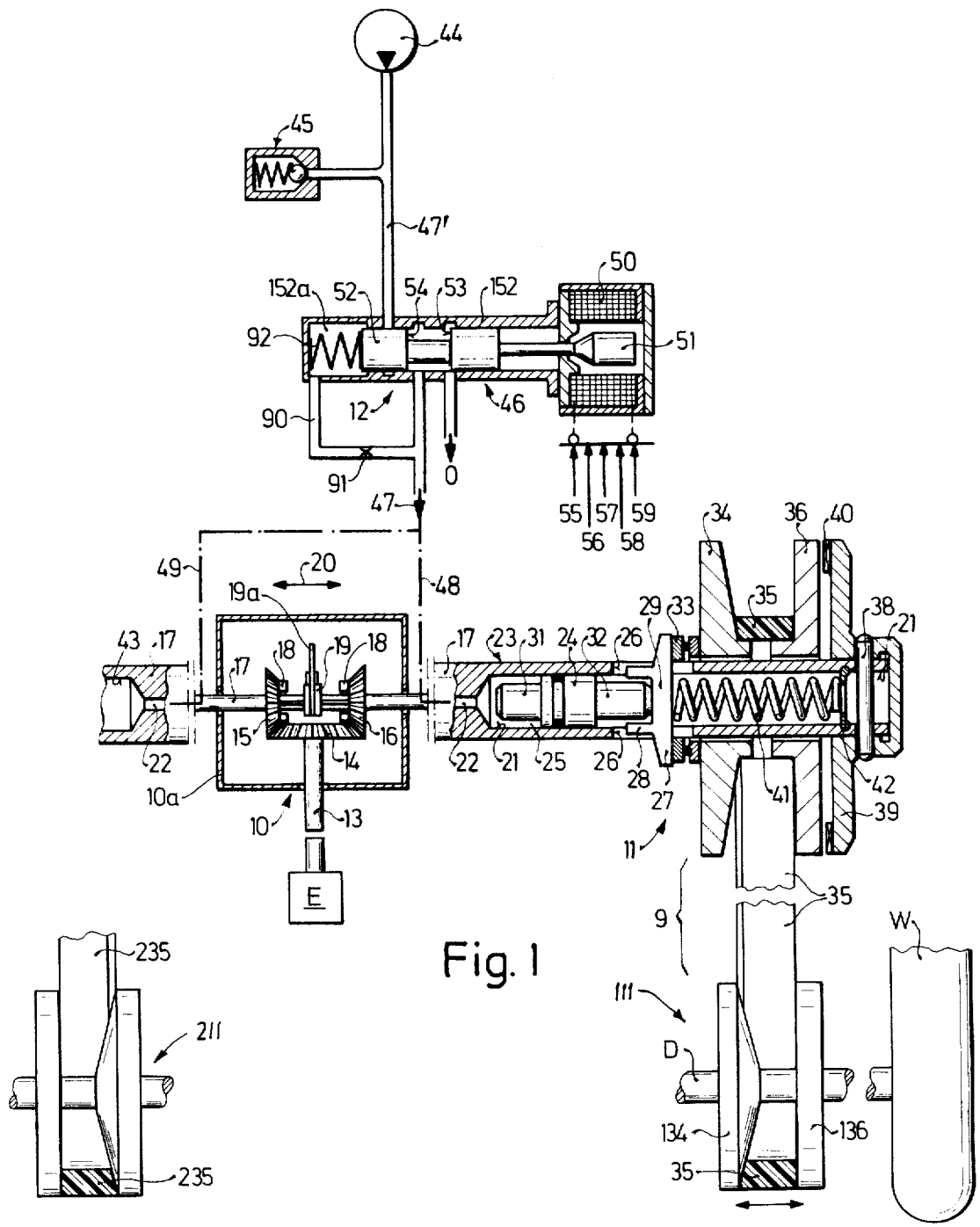
FIG. 1 is a schematic partly elevational and partly sectional view of a transmission system which embodies the invention.

FIG. 1 shows certain details of a transmission system wherein a belt drive 9 transmits torque from a driven output shaft 17 to a wheel W receiving torque from a shaft D. The belt drive 9 includes a first variable-pitch sheave 11 having two flanges 34, 36 each of which is rotatable on and movable axially of the output shaft 17, and a second variable-pitch sheave 111 having two flanges 134, 136 at least one of which is movable axially of the shaft D. The endless flexible element (e.g., a V-belt) which is trained over the sheaves 11 and 111 is shown at 35.

The transmission system further comprises a reversing gear 10 which has a housing 10a and includes three bevel gears 14, 15 and 16. The bevel gear 14 is fixed to one end of an input shaft 13 which is driven by the engine E of the automotive vehicle. The bevel gears 15, 16 are in permanent mesh with the bevel gear 14 and are rotatably mounted on the output shaft 17. A sleeve 19 which is shiftable axially of the shaft 17 by a fork 19a or the like has two sets of claws (not specifically shown) which can cooperate with the claws 18 on the bevel gear 15 or 16. The sleeve 19 has internal splines extending into axially parallel grooves of the output shaft 17 (or vice versa) so that it rotates with the shaft 17. When the fork 19a is moved to the right, as viewed in FIG. 1, the right-hand claws of the sleeve 19 engage the claws 18 of the bevel gear 16 so that the latter drives the output shaft 17 in a direction corresponding to forward movement of the vehicle. When the fork 19a is shifted to the left, as viewed in FIG. 1, the left-hand claws of the sleeve 19 engage the claws 18 of the bevel gear 15 whereby the shaft 17 is rotated in the opposite direction, provided that the bevel gear 14 is rotated by the input shaft 13. The directions in which the sleeve 19 is shiftable by the fork 19a are indicated by a double-headed arrow 20.

The right-hand portion 23 of the output shaft 17 has an axial bore 21 which can receive pressurized hydraulic fluid through an axially extending channel 22 of the output shaft 17. The left-hand portion of the bore 21 constitutes a cylinder 25 which receives, with minimal clearance, the larger-diameter central portion of a reciprocable shifting piston 24. The smaller-diameter end portions 31, 32 of the piston 24 respectively face the discharge end of the bore 22 and a motion-transmitting unit including a disk- or plate-like follower 29 and an antifriction ball bearing 33. The follower 29 has two outwardly extending arms 27 provided with extensions or lugs 28 which are slidable in axially parallel slots 26 machined into the portion 23 of the output shaft 17. The right-hand end portion 32 of the shifting piston 24 is located between the extensions 28 and thus limits the extent of radial movement of the follower 29 with respect to the output shaft 17. The slots 26 are preferably located diametrically opposite each other.

The ball bearing 33 is a thrust bearing and is interposed between the follower 29 and the left-hand flange 34 of the sheave 11 on the output shaft 17. When the pressure of fluid in the region of the end portion 31 increases, the piston 24 shifts the flange 34 in a direction to the right, as viewed in FIG. 1, whereby the flange 34 can move with or relative to the flange 36. A helical spring 41 which reacts against a split ring 42 in the right-hand end portion of the bore 21 urges the follower 29 in a direction to the left, as viewed in FIG. 1, so as to normally maintain the piston 24 in a first position corresponding to that position of the sheave 11 in which the latter does not receive torque from the output shaft 17.

The transmission system further comprises a clutch including a disk-shaped clutch element 39 having a hub which is attached to the output shaft 17 by a diametrically extending coupling pin 38. The left-hand end face of the clutch element 39 has claws 40 which can engage complementary claws on the right-hand end face of the flange 36 when the shifting piston 24 is moved axially of the bore 21 to a second position in which the output shaft 17 begins to rotate the flange 36. The disk 39 constitutes with the flange 36 a simple disk claw clutch which can transmit torque from the output shaft 17 to the sheave 11 in the aforementioned second position of the piston 24 as well as in a practically infinite number of third positions of the piston 24 which the latter assumes while moving the flange 34 toward the flange 36 to thereby change the speed ratio of the belt drive 9 or while allowing the spring 41 to move the flange 34 away from the flange 36. The spring 41 tends to maintain the piston 24 in the aforementioned first position in which the flange 36 is disengaged from the clutch element 39. The flange 36 is preferably loosely coupled to the flange 34 in such a way that it is disengaged from the clutch element 39 when the flange 34 assumes the axial position of FIG. 1.

The sheave 111 is assumed to drive one or both rear wheels W of an automotive vehicle. If desired, the transmission system may comprise two mirror-symmetrical belt drives each of which includes a sheave on the output shaft 17 and a sheave on the shaft D. FIG. 1 merely shows that the left-hand portion of the output shaft 17 is formed with a second cylinder 43 for a second shifting piston (not shown), and the second sheave 211 of a second belt drive including a second belt 235. The first sheave of the second belt drive is mounted on the output shaft 17 in the same way as described in connection with the sheave 11.

The means for displacing the shifting piston 24 in the cylinder 25 includes the aforementioned spring 41 and a hydraulic regulating unit 12 which can supply pressurized hydraulic fluid to the cylinder 25 by way of a conduit 48. A second conduit 49 can supply pressurized fluid to displace the shifting piston in the cylinder 43 of the shaft 17. The conduits 48, 49 branch from a pressure line 47 which communicates with a first port provided in the body 152 of a pressure regulating valve 46. This valve has a second port O which is connected with a tank, not shown, and a third port which is connected with a pressure line 47'. The latter receives pressurized fluid from a pump 44. A pressure relief valve 45 in the line 47' opens automatically when the fluid pressure in the line 47' exceeds a predetermined value whereby the fluid supplied by pump 44 can flow to the tank.

The means for moving a valve member or spool 52 of the regulating valve 46 in the valve body 152 comprises an electromagnet having a winding 50 and a magnetic core 51 connected with one end of the spool 52. The spool 52 has two annular shoulders 53, 54 which regulate the rate of flow of pressurized fluid from the line 47' to the line 47 and/or port O. A further conduit 90 which contains a flow restrictor 91 connects the pressure line 47 with a chamber 152a in the left-hand portion of the valve body 152. The chamber 152a contains a helical spring 92 which urges the spool 52 in a direction to the right so that, when the winding 50 is deenergized, the spring 92 automatically moves the spool 52 to a position (shown) in which the lines 47 and 47' are sealed from each other and the line 47 communicates with the port O so as to allow the spring 41 to maintain the shifting piston 24 in the first position shown in FIG. 1.

The devices which can influence the magnitude of solenoid current in the winding 50 are indicated by arrows 55 to 59. These devices may include a centrifugal governor (arrow 55) which regulates the magnitude of current as a function of changes in RPM of the input shaft 13, a gas pedal (arrow 56) which can be depressed to change the RPM of the input shaft 13, a kickdown switch (arrow 57) which can reduce the speed of the engine E, a device (arrow 58) which is actuated when the vehicle climbs a hill, and a brake (arrow 59). The brake may include a pedal and a switch (shown in FIG. 4) which is closed as soon as the operator's foot contacts the brake pedal, i.e., even before the brake pedal is pivoted to initiate a braking action.

Figure 2:
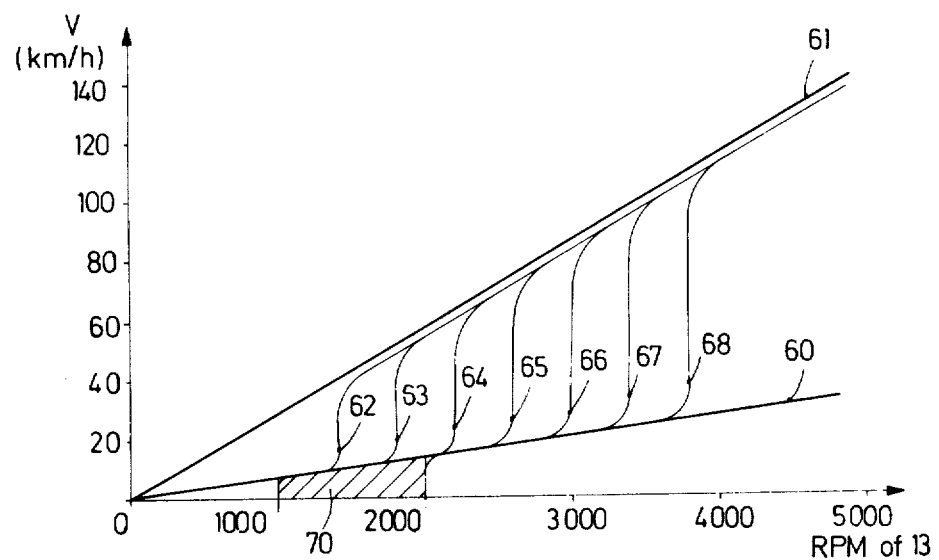
FIG. 2 is a diagram showing the manner in which the speed of the vehicle changes in response to changes in RPM of the output shaft of the engine.

In the diagram of FIG. 2, the RPM of the input shaft 13 is measured along the abscissa and the speed V (in kilometers per hour) is measured along the ordinate. The curve 60 indicates the changes of speed in response to changes in RPM of the input shaft 13 (i.e., in response to changes in the position of the gas pedal) at the highest transmission ratio of the belt drive 9, e.g., when the ratio of the speeds of sheaves 11, 111 is 14.5 to 1. The curve 61 indicates the changes of speed V in response to changes in RPM at the lowest transmission ratio (e.g., 3.5 to 1). The hatched speed range 70 between 1,000 and 2,000 RPM is the range at which the clutch including the element 39 is engaged or disengaged. The S-shaped curves 62, 63, 64, 65, 66, 67, 68 indicate the changes of speed in seven different angular positions of the gas pedal (arrow 56).

Figure 3:
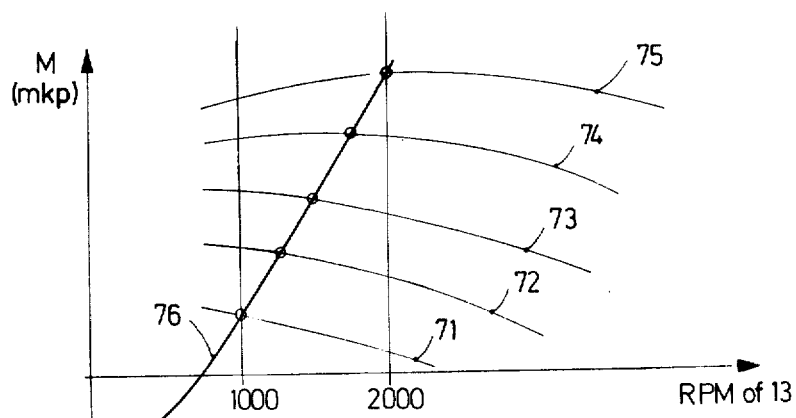
FIG. 3 is a similar diagram showing the changes in torque as a function of changes in RPM of the output shaft of the engine.

The diagram of FIG. 3 is an ordinate system wherein the RPM of the input shaft 13 is measured along the abscissa and the magnitude of transmitted torque M (in mkp) is measured along the ordinate. The curves 71, 72, 73, 74, 75 indicate variations in magnitude of the torque in response to five different changes of RPM, i.e., in response to movement of the gas pedal (arrow 56) to five different positions. The magnitude of torque which is transmitted by the clutch including the element 39 during starting of the vehicle varies in a manner as indicated by the curve 76.

The operation:

FIG. 1 shows the sleeve 19 in a neutral position while the engine E is idling. The winding 50 is not energized and the spring 92 in the chamber 152a of the valve body 152 is free to maintain the spool 52 in a position in which the spool seals the pressure line 47' from the line 47 and port O and allows the line 47 to communicate with the port O so that the pressure in the cylinder 25 equals atmospheric pressure and the spring 41 is free to push the follower 29 to the illustrated position. The input shaft 13 rotates but the output shaft 17 is idle and the flange 36 of the sheave 11 is disengaged from the clutch element 39.

If the driver wishes to start the vehicle, the fork 19a is activated to couple the sleeve 19 to the bevel gear 16 whereby the input shaft 13 begins to rotate the output shaft 17 and the clutch element 39. The driver also steps on the gas pedal (arrow 56) whereby the winding 50 is energized and the core 51 is shifted in a direction to the left, as viewed in FIG. 1, so that the spool 52 seals the port O but allows pressurized fluid to flow from the line 47' into the line 47 and conduit 48. The channel 22 receives pressurized fluid and the piston 24 shifts the motion-transmitting means 29, 33 toward the clutch element 39. The flanges 34, 36 of the sheave 11 move as a unit and the flange 36 engages the rotating clutch element 39 so that the belt 35 begins to drive the sheave 111, shaft D and wheel W. The energization of winding 50 is dependent on the position of the gas pedal (arrow 56) and the RPM of input shaft 13 (arrow 55). The starting of the vehicle is completed when the speed of the flange 34 equals the speed of the flange 36. It is clear that the line 47 supplies fluid also to the conduit 49 and cylinder 43 so that the second belt drive including the sheave 211 begins to transmit torque together with the belt drive 9.

The pressure of fluid in the cylinder 25 increases with increasing RPM of the input shaft 13 (arrow 55) and/or in response to further depression of the gas pedal (arrow 56) whereby the piston 24 shifts the flange 34 toward the flange 36 to increase the speed ratio of the belt drive 9 and hence the speed of the wheel W. Such movement of the flange 34 toward the flange 36 causes the belt 35 to move away from the axis of the output shaft 17 and nearer to the axis of the shaft D, i.e., the distance between the flanges 134, 136 increases. Inversely, if the RPM of the shaft 13 decreases and/or the extent of depression of the gas pedal is reduced, the spring 41 pushes the flange 34 away from the flange 36 so that the speed ratio of the belt drive 9 is changed in a direction to reduce the speed of the wheel W.

The ratio of the belt drive 9 can also be changed by actuating the kickdown switch (arrow 57), on an inclined road (arrow 58) and/or during braking (arrow 59). Each of the shifting devices represented by arrows 55–59 effects an appropriate change in the magnitude of current in the winding 50 and hence in the axial position of the spool 52 to thereby influence the pressure of fluid in the conduits 48, 49.

Figure 4:
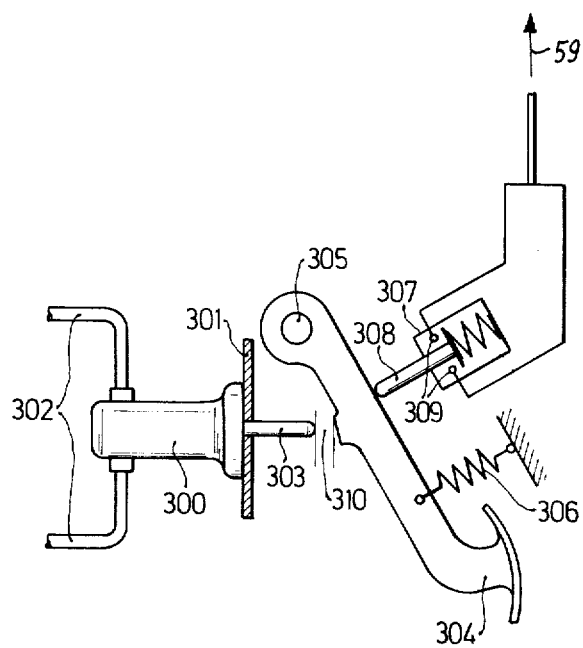
FIG. 4 is a partly elevational and partly sectional view of a brake system and a switch which adjusts the pressure regulating valve in response to initial depression of the brake pedal.

FIG. 4 shows a brake cylinder 300 which is mounted on a portion 301 of the frame of the automotive vehicle. This cylinder is connected with two brake lines 302 and contains a piston connected with a piston rod 303. A brake pedal 304 is pivotable on a fixed pin 305 and is biased by a helical return spring 306 so that it normally assumes an idle or nondepressed position (shown in FIG. 4). The aforementioned switch has a housing 307 for two fixed contacts 309 and a portion of a movable contact 308 (e.g., a plunger) which is biased by a helical spring so that it bears against the brake pedal 304. When the brake pedal 304 assumes the idle position of FIG. 4 (under the bias of the spring 306), the movable contact 308 is disengaged from the fixed contacts 309 and a projection of the pedal 304 is separated from the piston rod 303 by a clearance or gap 310. This clearance is desirable in order to insure that the brake is not actuated in response to unintentional slight depression of the pedal 304, e.g., due to carelessness of the driver.

The switch in the housing 307 is designed to close before the brake pedal 304 reduces the width of the clearance 310 to zero, i.e., before the brake pedal displaces the piston rod 303. The closing of switch in the housing 307 results in transmission of a signal (arrow 59) which influences the electromagnet 50, 51 in such a way that the ratio between the engine and the transmission changes (e.g., to 1:4) so that the engine E furnishes a pronounced braking action even before the brake cylinder 300 is actuated.

This will be readily appreciated by bearing in mind the operation of an automatic transmission for automotive vehicles. Thus, when the driver wishes to accelerate the vehicle to a given speed by depressing the gas pedal (arrow 56 in FIG. 1), the electronic control system automatically changes the speed ratio between the engine and the transmission to the lowest ratio (e.g., one-to-one) as soon as the speed of the vehicle reaches the desired value. This reduces the fuel consumption upon completion of acceleration to a desired speed. However, and since the ratio is low (one-to-one), the engine can produce a negligible braking action (when necessary) so that the deceleration must be effected almost exclusively by the brake system, i.e., by the brake shoes which are actuated by the cylinder 300. In vehicles wherein the speed changes are effected by manual shifting, the braking action of the engine increases in response to shifting into a lower gear. Consequently, and especially in city traffic when the driver normally shifts into a low gear, the engine produces a substantial braking action which is desirable for obvious reasons. Such advantage is not exhibited by vehicles with conventional automatic transmissions. However, the signal which is generated by the switch in the housing 307 of FIG. 4 (see the arrow 59) causes the electromagnet 50, 51 to change the position of the piston 24 even before the pedal 304 reaches the piston rod 303 so that the engine E begins to furnish a pronounced braking action which assists the braking action of the cylinder 300.

The manner in which the parameters indicated by arrows 55–59 influence the electromagnet 50–51 is disclosed, for example, in the commonly owned application Ser. No. 190,168 filed Oct. 18, 1971 by Espenschied et al and now abandoned (refer particularly to FIGS. 4–5 of Ser. No. 190,168). This application discloses an electronic circuit which can furnish an output signal whereby the intensity of such output signal depends on one or more parameters represented by the arrows 55–59.

An important advantage of the improved transmission system is that its construction is extremely simple and that the displacing means 12, 41 for the shifting piston 24 is compact, reliable and capable of changing the speed ratio of the belt drive 9 with a minimum of delay as well as with a high degree of reproducibility. The savings in space are achieved in part by mounting the shifting piston 24 in the output shaft 17 and by employing a single disk clutch as a means for transmitting torque from the output shaft 17 to the sheave 11. This is in contrast to heretofore known clutches which employ flyweights.

The provision of an electromagnet 50, 51 which can be influenced by a number of devices (arrows 55–59) also contributes to simplicity and compactness of the transmission system.

The hydraulic regulating unit 12 insures that the output shaft 17 and its clutch element 39 can transmit to the sheave 11 any desired amount of torque. The provision of a single pressure regulating valve 46 whose electromagnet 50, 51 is responsive to changes in a substantial number of parameters also contributes to simplicity, compactness, reliability and rapid reaction of the displacing means for the shifting piston.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by letters Patent is set forth in the appended claims.

1. In a transmission system for automotive vehicles or the like, a combination comprising a driven output shaft; a belt drive having a plurality of speed ratios and including two variable-pitch sheaves and an endless flexible element trained over said sheaves, one of said sheaves including two flanges axially movably and rotatably mounted on said output shaft, one of said flanges being movable axially of the other of said flanges; a clutch element mounted on and driven by said output shaft, said clutch element being adjacent to said other flange; means for moving said flanges with and relative to each other and comprising a hydraulic motor having a reciprocable piston constituting a shifting member and displaceable between a first position in which said other flange is disengaged from said clutch element so that said output shaft and said one sheave can rotate relative to each other, a second position in which said other flange is driven by said clutch element when said output shaft rotates, and a plurality of third positions in each of which said one flange is located at a different distance from said other flange so that each third position of said piston corresponds to a different speed ratio of said belt drive; and means for displacing said piston and comprising a single valve having a valve member movable between a plurality of positions each corresponding to a different fluid pressure in said motor and a plurality of devices each of which is arranged to influence the position of said valve member and therewith the pressure of hydraulic fluid in said motor to thus change the position of said piston.

2. A combination as defined in claim 1, wherein said valve includes electromagnet means for moving said valve member, said plurality of devices cooperating with said electromagnet means.

3. A combination as defined in claim 1, wherein said displacing means includes resilient means arranged to bias said shifting member to said first position.

4. A combination as defined in claim 1, wherein one of said devices includes a movable brake pedal.

5. A combination as defined in claim 4, wherein said one device further includes a switch which is actuated in response to engagement of said pedal preparatory to movement of said brake pedal from an idle position to one of a plurality of braking positions.

6. A combination as defined in claim 1, wherein said motor further comprises a portion of said shaft and said portion of said shaft defines a cylinder for said piston.

7. A combination as defined in claim 6, further comprising motion transmitting means interposed between said piston and said one flange.

8. A combination as defined in claim 7, wherein said shaft has at least one axially parallel slot and said motion transmitting means comprises a follower having a portion extending into and movable lengthwise of said slot so that said follower rotates with and is movable axially of said shaft.

9. A combination as defined in claim 8, wherein said displacing means comprises a spring arranged to bias said follower against said piston.

10. A combination as defined in claim 8, wherein said motion transmitting means further comprise an antifriction bearing interposed between said follower and said one flange.

11. A combination as defined in claim 2, wherein said electromagnet means comprises a winding and a core connected with said valve member and movable relative to said winding in response to changes in the magnitude of current flowing in said winding, each of said plurality of devices being actuatable to change the magnitude of said current.

* * * * *